US006863392B2

(12) United States Patent
Shimomura et al.

(10) Patent No.: US 6,863,392 B2
(45) Date of Patent: Mar. 8, 2005

(54) INK-JET RECORDING PROCESS, INK-JET RECORDED IMAGE AND METHOD OF ALLEVIATING DIFFERENCE IN GLOSS IN THE INK-JET RECORDED IMAGE

(75) Inventors: Masako Shimomura, Kanagawa (JP); Hiromichi Noguchi, Tokyo (JP); Isao Kimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 10/268,961

(22) Filed: Oct. 11, 2002

(65) Prior Publication Data

US 2003/0085974 A1 May 8, 2003

(30) Foreign Application Priority Data

Oct. 15, 2001 (JP) ....................................... 2001/317000

(51) Int. Cl.[7] ............................ G01D 11/00; B41J 2/01
(52) U.S. Cl. ....................................... 347/100; 347/101
(58) Field of Search ............................ 347/95, 98, 100, 347/101, 105

(56) References Cited

U.S. PATENT DOCUMENTS

| | | | | | |
|---|---|---|---|---|---|
| 5,087,601 | A | * | 2/1992 | Hotta et al. | 503/200 |
| 5,314,861 | A | * | 5/1994 | Morohoshi et al. | 503/227 |
| 5,686,382 | A | * | 11/1997 | Suzuki et al. | 503/201 |
| 5,837,045 | A | | 11/1998 | Johnson et al. | 106/31.85 |
| 5,933,164 | A | * | 8/1999 | Sato et al. | 347/43 |
| 5,952,401 | A | | 9/1999 | Kimura et al. | 523/161 |
| 6,123,411 | A | | 9/2000 | Inui et al. | 347/43 |
| 6,193,361 | B1 | * | 2/2001 | Wen | 347/84 |
| 6,322,208 | B1 | * | 11/2001 | Bugner et al. | 347/104 |
| 6,428,143 | B2 | * | 8/2002 | Irihara et al. | 347/43 |
| 6,428,862 | B1 | | 8/2002 | Noguchi | 427/511 |
| 6,503,307 | B1 | | 1/2003 | Noguchi | 106/31.27 |
| 2002/0064603 | A1 | | 5/2002 | Noguchi | 427/466 |

FOREIGN PATENT DOCUMENTS

| | | | |
|---|---|---|---|
| EP | 1 022 151 | A2 | 7/2000 |
| EP | 1 057 646 | A2 | 12/2000 |
| JP | 200-186243 | A | 7/2000 |
| JP | 2000-186242 | A | 7/2000 |
| JP | 2001-277488 | A | 10/2001 |
| JP | 2002-144551 | A | 5/2002 |

* cited by examiner

*Primary Examiner*—Ke Figgins
*Assistant Examiner*—An H. Do
(74) *Attorney, Agent, or Firm*—Fitzpatrick, Cella, Harper & Scinto

(57) ABSTRACT

The invention relates to a process for producing a high-quality ink-jet recorded image. The process comprises the steps of (i) applying a first ink containing at least one colorant to an opaque printing medium by an ink-jet method to form a visible image; and (ii) applying a second ink, which does not change or substantially not change the hue of the printing medium, to a portion of the printing medium that is complementary to the visible image, thereby alleviating a difference in gloss between the visible image and the portion complementary to the visible image.

8 Claims, 3 Drawing Sheets

CONCEPTUAL VIEW OF DRIVE WAVEFORM

INK-JET RECORDING PROCESS, INK-JET RECORDED IMAGE AND METHOD OF ALLEVIATING DIFFERENCE IN GLOSS IN THE INK-JET RECORDED IMAGE

BACKGROUND OF THE INVENTION

1. Field of the Invention

The present invention relates to an ink-jet recording process in which energy is applied to an ink to eject the ink from fine orifices, thereby conducting recording, and an ink-jet recorded image. The present invention is suitable for use in the field of commercial printings such as posters and pamphlets.

2. Related Background Art

The advancement of ink-jet recording techniques in recent years has permitted achieving high-definition images like a silver salt photograph by an ink-jet recording method. Both improvement of inks and improvement of printing media contribute to the achievement of such an image. By the way, printing media having an ink-receiving layer on a base material to enhance ink absorbency are often used as printing media used in the formation of such a high-definition image. However, surfaces of such printing media include both surfaces having high gloss and comparatively matt finished surfaces having poor gloss. On the other hand, the gloss of an image formed on a printing medium varies according to the kind of an ink used. For example, an image formed with an ink containing a water-soluble coloring material, specifically, a dye or the like takes over the gloss of the printing medium as it is. On the other hand, an image formed with an ink containing a water-insoluble coloring material, for example, a pigment tends to become an image little in gloss because the pigment is easy to remain on the surface of the printing medium. Further, an ink containing a photo-curing resin forms an image having an extremely smooth surface because a resin film is formed by irradiation of light after recording. The image often shows high gloss. Therefore, a great difference in visual gloss arises between an image-formed portion and an exposed portion of a printing medium existing complementarily to the image-formed portion according to a combination of the printing medium and the ink. This difference is considered to be a cause that a person feels a sense of incompatibility to a high-definition image formed by ink-jet.

In order to solve such a problem, Japanese Patent Application Laid-Open No. 2002-144551 describes an ink-jet recording process comprising ejecting a plurality of pigment inks of different colors to a printing medium having an ink-receiving layer on a base material to record characters and/or images, wherein an overcoating liquid having a film forming ability is ejected in a proportion of from 30 to 100% by weight based on a shot-in ink quantity per unit area to a recorded portion where a shot-in ink quantity per unit area is at least 50% by weight based on the shot-in ink quantity per unit area when a shot-in ink quantity per unit area of each of the plural pigment inks becomes maximum. In other words, the overcoating liquid is applied to the recorded portion by the pigment inks hard to achieve high surface gloss to form a film, whereby the gloss of the recorded portion is improved.

However, this process has failed to sufficiently cope with various combinations of printing media and inks. In addition, since the film is additionally formed on the ink-applied portion, the visible image portion seems to project from the surface of the printing medium. This fact may give a sense of incompatibility to a person who looks at the image in some cases.

Japanese Patent Application Laid-Open No. 2001-277488 discloses an ink-jet recording process comprising using an ink-jet printer having a plurality of heads for respectively ejecting at least two black inks different in density and an ink containing no colorant used only at a blank portion of a printing medium and ejecting the inks to the printing medium from the plural heads to form an image, wherein the black inks and the ink containing no colorant contain fine polymer particles having an average particle diameter of from 10 to 1,000 nm. The Japanese Patent Application Laid-Open No. 2001-277488 describes at [0021] that the fine polymer particles preferably form a film during or after drying. However, this prior art document does not describe anything about an object of the present invention that a difference in gloss between a black image portion and a blank portion is alleviated. The investigation by the present inventors has revealed that the gloss of an image portion formed by the pigment inks is relatively low, while the gloss of a blank portion formed by the ink containing no colorant and containing the fine polymer particles having a film forming ability is high, and so a difference in gloss between the image portion and the blank portion is not alleviated at all even by this technique.

SUMMARY OF THE INVENTION

The present inventors have carried out various investigations. As a result, a technique capable of making uniform the gloss of an ink-jet recorded image according to various combinations of printing media and inks has been found, thus leading to completion of the present invention.

It is therefore an object of the present invention to provide an ink-jet recorded image having no difference in gloss between a visible image portion and a portion complementary to the visible image portion or little difference and a production process thereof.

The above object can be achieved by the present invention described below.

According to an embodiment of the present invention, there is provided an ink-jet recording process, comprising the steps of (i) applying a first ink comprising at least one colorant to an opaque printing medium by an ink-jet method to form a visible image; and (ii) applying a second ink, which does not change or substantially not change the hue of the printing medium, to a portion of the printing medium that is complementary to the visible image, thereby alleviating a difference in gloss between the visible image and the portion complementary to the visible image.

According to another embodiment of the present invention, there is provided an ink-jet recorded image having a visible image formed on an opaque printing medium with a first ink by an ink-jet method, wherein a complementary portion to the visible image on the printing medium has surface gloss that is equal or substantially equal to the surface gloss of the visible image, and the surface gloss of the portion is equalized by applying a second ink to the portion, the second ink does not color or substantially not color the portion.

According to a further embodiment of the present invention, there is provided a method of alleviating a difference in gloss between a visible image formed with at least one ink to an opaque printing medium by an ink-jet method and a portion complementary to the visible image, comprising the step of applying a second ink, which does not color or substantially not color the printing medium, to the portion, thereby alleviating a difference in gloss in the ink-jet recorded image.

DETAILED DESCRIPTION OF THE PREFERRED EMBODIMENTS

The present invention will hereinafter be described in more detail with reference to the preferred embodiments of the invention.

Figure 1:
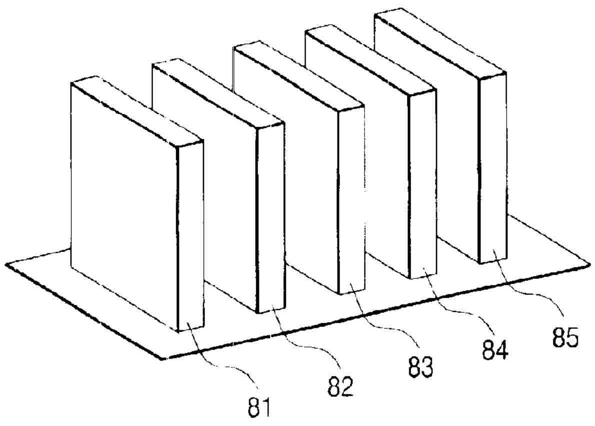
FIG. 1 schematically illustrates an ink-jet recording apparatus according to an embodiment of the present invention.
Figure 5A:
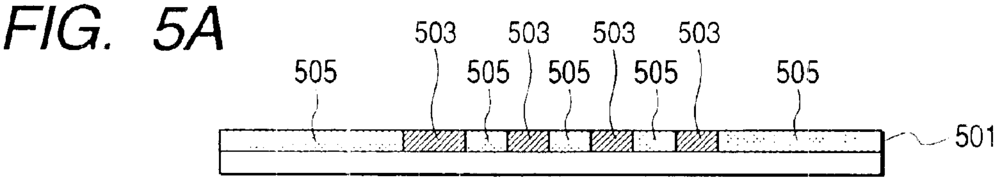
FIG. 5A is a typical cross-sectional view of a printing medium to which a first and second inks have been applied.
Figure 5B:
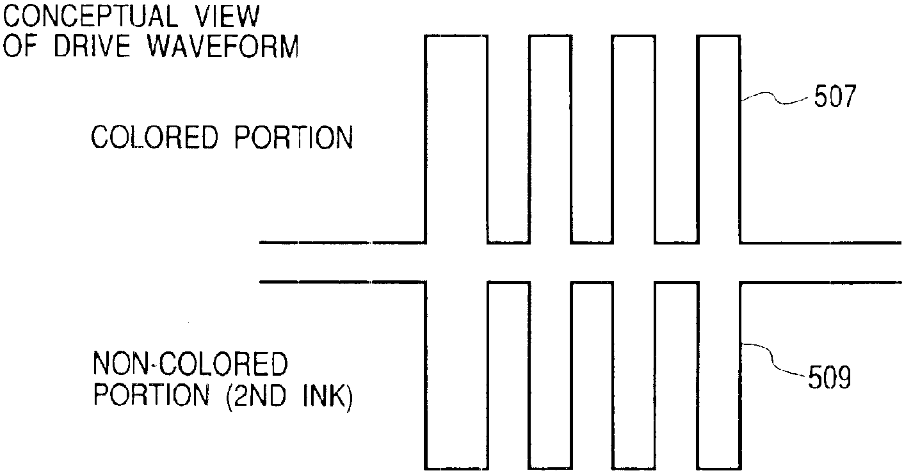
FIG. 5B illustrates a way of applying the first and second inks.

An ink-jet recording apparatus used in an ink-jet recording process according to the present invention is equipped with a head for ejecting a second ink applied to a portion, which exists complementarily to a visible image on a printing medium and will become a background of a visible image, in addition to heads for ejecting first inks used in the formation of the visible image. More specifically, for example, a recording apparatus, in which five recording heads composed of four heads for ejecting four first inks of yellow (Y), magenta (M), cyan (C) and black (Bk) for formation of the visible image, respectively, and a head for ejecting the second ink are arranged on a carriage, is used. An example thereof is illustrated in FIG. 1. Reference numerals 81, 82, 83 and 84 indicate recording heads for ejecting recording inks of Y, M, C and Bk colors, respectively. Reference numeral 85 designates a head for ejecting the second ink applied to the background portion. The heads are arranged in the above-described recording apparatus and serve to eject the respective recording inks of Y, M, C and Bk colors according to recording signals (see 507 in FIG. 5B) and to send a recording signal indicating that the background portion is colored with a transparent color (see 509 in FIG. 5B) to eject the second ink, thereby completely covering a printable region of the printing medium with the inks. FIG. 5A is a schematic cross-sectional view of an ink-jet recorded image obtained by the above-described process. In FIG. 5A, reference numeral 501 indicates a printing medium, 503 a visible image portion (colored portion) formed by applying the first inks, 505 a region (non-colored portion) that forms a background of the visible image and is applied by the second ink. The second ink is adjusted in such a manner that the surface gloss of a portion of the printing medium applied to the second ink is equal or substantially equal to the surface gloss of the visible image portion. In the ink-jet recorded image shown in FIG. 5A, there is thus no great difference in surface gloss between the visible image portion and the background portion, and the ink-jet recorded image is provided as an image that a person who looks at the recorded image does not feel a sense of incompatibility.

Incidentally, it is preferred that printing be carried out so as not to expose the surface of the printing medium between the visible image portion 503 and the background portion 505 in FIG. 5A as much as possible. However, according to how that the inks on the printing medium bleed, the ink of the non-colored portion may bleed into the colored portion, or the printing medium may be exposed at a boundary surface if the bleeding is little. When the degree of exposure of the printing medium is caused by insufficient bleeding, such exposure does not interfere with the evenness of glossiness and smoothness.

Non-printed portions (edges) for feeding and discharging the printing medium in the printer, which are located at the periphery of the printing medium, are also regarded as non-colored portions and become regions intended to be printed with the clear ink. In other words, it is also an embodiment in the scope of the present invention to cover the whole printed surface of the printing medium with the color inks and non-color ink. In this case, it can be expected that the durability of the ink-jet recorded image, such as light fastness and ozone fastness is improved because the exposed surface of the printing medium is eliminated.

Figure 2:
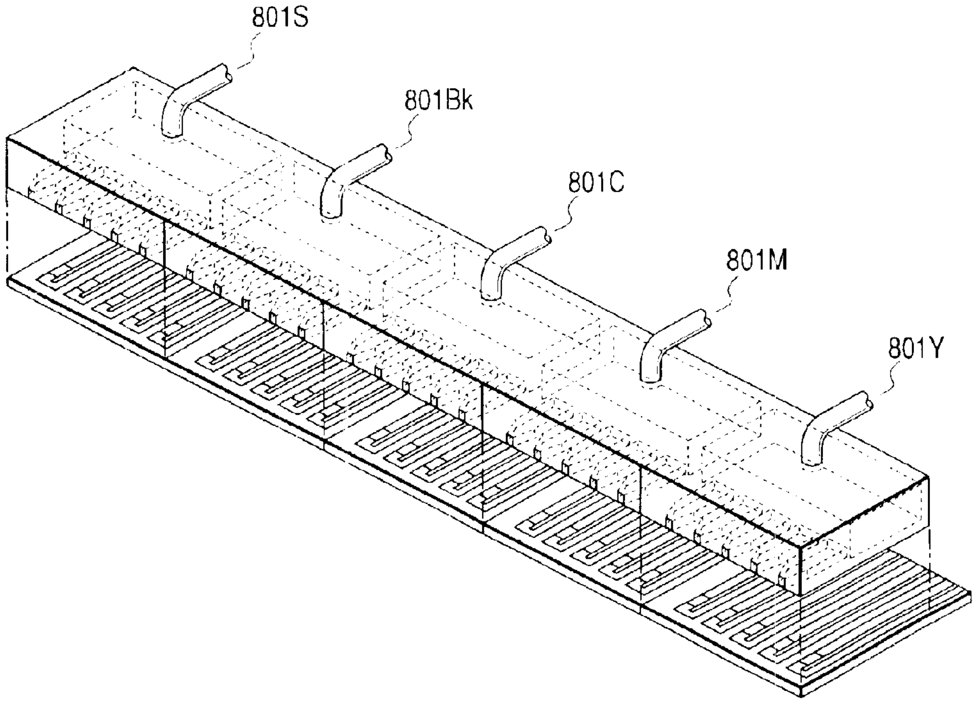
FIG. 2 schematically illustrates an ink-jet recording apparatus according to another embodiment of the present invention.

FIG. 1 shows the case where the five recording heads have been used. However, the present invention is not limited thereto. As shown in FIG. 2, preference is given even to the case where flow paths of yellow 801Y, magenta 801M, cyan 801C and black 80Bk inks and a colorless liquid composition 801S are separately provided in one recording head. It goes without saying that the construction of the head may be changed so as to reverse the recording order of the liquid composition and the inks as described above.

Figure 3:
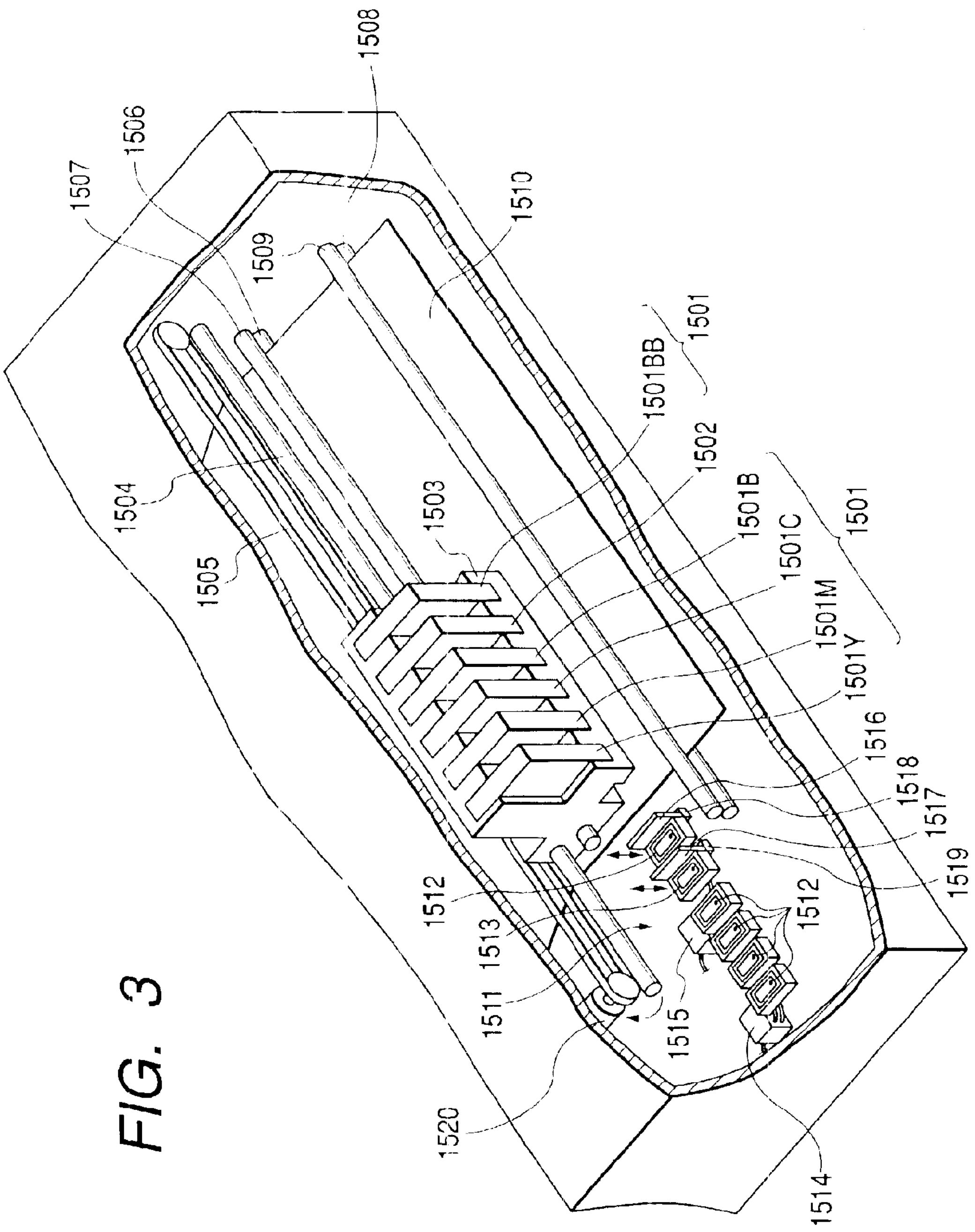
FIG. 3 is a typical perspective view schematically illustrating the construction of an ink-jet printer according to an embodiment.

FIG. 3 is a typical perspective view illustrating the schematic construction of an ink-jet printer according to an embodiment. In FIG. 3, reference numeral 1504 indicates a scanning rail extending in a main scanning direction of a carriage 1503 and slidably supporting the carriage, and 1505 a driving belt for transmitting driving power for reciprocating the carriage 1503. Reference numerals 1506, 1507 and 1508, 1509 designate pairs of conveying rollers which are arranged in front and in rear of a printing position by the printing heads and hold and convey a printing medium 1510. The printing medium 1510 such as paper is guided and supported on a platen (not illustrated) for regulating a printing surface flat at the printing position in contact under pressure. At this time, ejection-orifice-forming faces of the respective head cartridges (heads) 1501, 1502 mounted on the carriage 1503 are located between the printing medium conveying rollers 1507, 1509 projecting downward from the carriage 1503 so as to oppose in parallel with the printing medium 1510 in contact under pressure with a guide surface of the platen (not illustrated).

In FIG. 3, on the carriage 1503, six head cartridges in total are positioned and mounted, and in this embodiment, are arranged in order of a printing head 1501Y for a yellow ink, a printing head 1501M for a magenta ink, a printing head 1501C for a cyan ink, a printing head 1501B for a black ink, a liquid-composition-ejecting head 1502 and a printing head 1501BB for a second black ink from the left side to the right side in FIG. 3. The liquid-composition-ejecting head 1502 serves to eject a liquid composition reactive to coloring materials in the inks to the printing medium 1510. The printing head 1501BB for the second black ink arranged at the right end is a printing head used for a black ink employed, for example, upon secondary scanning printing in reciprocating printing. More specifically, the apparatus is so constructed that the liquid-composition-ejecting head 1502 is arranged next to (on the right side of) the printing head 1501B for the black ink in the above-described respective embodiments, and the printing head 1501BB for the second black ink is further arranged next (at the right end).

In FIG. 3, a recovery unit 1511 is arranged on the left side of the printing region. In the recovery unit 1511, caps 1512 for capping the printing heads 1501Y, 1501M, 1501C and 1501B are successively arranged from the left to the right corresponding to the arrangement of the head cartridges 1501, 1502, a cap 1513 for capping the liquid-composition-ejecting head 1502 is arranged next (on the right side), and a cap 1512 for capping the printing head 1501BB for the second black ink is further arranged on the right side (at the right end). The respective caps are provided vertically movably. When the carriage 1503 is located at the home position, the corresponding caps 1512, 1513 are brought into contact with the ejection-orifice-forming faces of the respective heads 1501 and 1502, whereby the ejection orifices of the heads 1501 and 1502 are closely sealed (capped). By this capping, the thickening or crusting of the inks due to evaporation of solvents in the inks is prevented, and so occurrence of ejection failure is prevented.

The recovery unit 1511 is also equipped with a suction pump 1514 communicating with the caps 1512 and a suction pump 1515 communicating with the cap 1513. These pumps 1514 and 1515 are used in capping the respective ejection-orifice-forming faces with the caps 1512 and 1513 to practice a suction recovery treatment when the printing heads 1501 and/or the liquid-composition-ejecting head 1502 cause ejection failure. A blade 1517 for the liquid-composition-ejecting head 1502 is further arranged between the fifth cap 1513 for the liquid composition from the left end and the sixth cap 1512 for the black ink (located at the right end), and a blade 1516 for the respective printing heads 1501 is arranged on the right side (printing region side) of the cap 1512 located at the right end. The blade 1517 is held by a blade holder 1519, and the blade 1516 is held by a blade holder 1518. In this embodiment, these blade holders 1518 and 1519 are lifted and lowered by a blade elevating mechanism (not illustrated) driven by utilizing the movement of the carriage 1503, whereby the blades 1516 and 1517 are lifted and lowered between a projected position (wiping position) to wipe the inks and foreign matter attached to the ejection-orifice-forming faces of the heads 1501 and 1502 and a receded position (stand-by position) coming into no contact with the ejection-orifice-forming faces. In this case, the blade 1516 for wiping the printing heads 1501 and the blade 1517 for wiping the liquid-composition-ejecting head 1502 are constructed in such a manner that they can be caused to separately go up and down independently of each other.

Any inks may be used as inks suitable for use in the present invention so far as they can be used in printing by an ink-jet printer.

In the present invention, which ink should be used as the second ink is determined according to a combination of the printing medium and the first inks. More specifically, when an ultraviolet-curing inks are used as the first inks as described above, a transparent film of an ultraviolet-curing oligomer is formed at a colored portion irrespective of the kind of a coloring material such as a dye or pigment, and so the smoothness is enhanced, and the glossiness becomes higher than the printing medium. In a portion high in image density, the glossiness becomes higher than its surrounding portion of the printing medium, while in a portion low in image density, irregularities are caused between a film-formed portion and a non-colored portion of the printing medium, and the glossiness of the printed portion is felt uneven. When the first inks are pigment inks, a pigment is fixed to the surface of the printing medium unlike dye inks coloring the surface of the printing medium. Glossiness differs between the printing medium and the printed portion according to image density and the kind of paper used. Since smoothness of the printed surface is almost equal to that of the printing medium such as paper having low surface smoothness, semiglossy paper, plain paper or matted paper (high-quality exclusive paper; trade name: HR101, product of Canon Inc., or the like), the glossiness of the resulting print is uniform irrespective of image density. In paper very high in smoothness or a film (trade name: Professional Photo-paper PR101; or trade name: Glossy Film HG201, product of Canon Inc.) by which an image quality like a silver salt photograph is achieved, however, irregularities of pigment particles fixed to the printing medium are greater than irregularities of the printing medium itself, and so the glossiness is worsened. In paper classified between matted paper and very high glossy paper, i.e., the so-called ordinary paper for photograph (photo-glossy paper; trade name: GP301, product of Canon Inc.), irregularities of the printing medium itself are greater than irregularities of pigment particles fixed to the printing medium, and so the glossiness becomes high at a portion high in image density. It is important to suitably prepare the second ink according to the combination of the printing medium and the first inks.

The constitution of the present invention will hereinafter be described in more detail by two embodiments.

(First Embodiment)

First inks containing a pigment as a coloring material:

When the first inks contain a pigment as a coloring material, and the printing medium is paper very high in surface smoothness or a film, most of the pigment is located at the surface of the printing medium or at the surface and in the vicinity of the surface. Therefore, the glossiness of the surface of a visible image portion becomes lower than the surface gloss of the printing medium. Accordingly, the second ink is preferably formulated so as to lower the surface gloss of the printing medium. As such a second ink, is preferred an ink containing inorganic fine particles having an average particle diameter of at most 200 $\mu$m, such as alumina sol, silica sol or titanium oxide finely divided, or transparent or achromatic fine particles of a resin dispersed in water, such as a latex or dendrimer, or the like for the purpose of adjusting the smoothness. When the average particle diameter is greater than 200 $\mu$m, a nozzle is clogged, and the shelf stability of the resulting ink is deteriorated due to precipitation or the like. It is hence not preferable to use any fine particles having an average particle diameter greater than 200 $\mu$m. The fine particles are produced by crushing, grinding, solution polymerization or the like, and classification treatment is conducted if necessary. A surface treatment may also be conducted as necessary for the end application intended, such as improvement in dispersibility. Any fine particles may be used. Plural kinds of fine particles having either a relatively great particle diameter or a relatively small particle diameter may also be used for the purpose of adjusting the glossiness. In order to adjust the glossiness or protect the printing medium from light, gases, water and stain, such a polymer component that forms a transparent film after evaporation of water may preferably be contained. As the polymer component, is preferred a pigment dispersant such as an acrylic resin, styrene-acrylic acid resin or benzyl acrylate, or a substance used in a coating layer of printing media, such as polyvinyl alcohol, cellulose, water-soluble chitosan, starch or polyethylene oxide having a molecular weight of at least 1,000, or an analogue thereof. The fine particles and film-forming polymer may be suitably selected according to the kinds of the inks used in the colored portion and the printing medium used.

In both first and second inks, the following compounds are preferably formulated into inks taking into consideration the fact that they are applied to a printing medium by an ink-jet method. In order to enhance reliability of heads, such as anti-clogging of nozzles, an organic solvent having a high boiling point may preferably be added. Examples of preferable organic solvents include glycol ethers, glycols, aprotic polar solvents, glycerol, urea, urea derivatives such as ethyleneurea and dihydroxyethylurea, and lower alkyldiols having at most six carbon atoms. However, the aprotic polar solvents and glycol ethers are excellent as those having an effect without increasing the viscosity of the resulting ink. In order to enhance the persistency of printing and penetrability into printing media, a small amount of a surfactant or a lower alcohol having at most three carbon atoms may also be added. Examples of preferable surfactants include surfactants such as polyoxyalkyl ethers, polyoxyalkyl esters, Pluronics obtained by block-polymerizing ethylene oxide and propylene oxide, acetylene glycol-ethylene oxide adducts, and dimethylsiloxane-ethylene oxide-propylene oxide adducts. Besides, additives such as mildewproofing agents, pH adjusters, such as inorganic alkalis such as sodium hydroxide, potassium hydroxide and lithium hydroxide, alkanolamines such as triethanolamine, dibasic acids such as oxalic acid, succinic acid, malonic acid, gluconic acid and adipic acid, and organic acids such as formic acid, acetic acid and propionic acid, ultraviolet absorbents, waterproofing agents, inorganic salts such as ammonium sulfate, organic salts, and chelating agents for scavenging impurity metals may be added if necessary. In order to prevent bleeding at boundaries between color inks and a black ink, a polyvalent metal salt may be added to non-black inks for colored portion. Polyvalent metals include $Zn^{2+}$, $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$ and $Al^{3+}$. However, the present invention is not limited thereto. Preferable anions bonded to these ions include $No_3^-$, $F^-$, $Cl^-$, $Br^-$, $I^-$, $CH_3COO^-$ and $SO_4^{2-}$.

In an ink-jet printer, an ink set composed of five color inks of yellow, magenta, cyan, black and clear inks or an ink set composed of seven color inks in total with a pale cyan ink and a pale magenta ink added thereto when a high-definition image like a photograph is provided is used. Besides, inks of special colors such as green, orange, dark yellow and gray may be used without any problems.

The construction of printing heads is preferably such that printing heads for the respective colors are transversely arranged in a row or vertically arranged in plural rows.

As a system of ejecting ink droplets, may be used either a system in which recording signals are applied to an ink within a printing head to eject ink droplets by thermal energy generated, or a system in which ink droplets are ejected by vibration of a piezoelectric oscillator using a piezoelectric element.

(Second Embodiment)

Use of a coloring material, a photo-curing oligomer and a photopolymerization initiator in first inks:

A feature of a photo-curing ink resides in that the glossiness and smoothness of a printed portion become high irrespective of the kind of the printing medium because the ink is excellent in film-forming ability. Accordingly, it is also necessary to formulate an ink, by which both glossiness and smoothness will become high, as a second ink applied to a background portion. In general, an ink obtained by removing a coloring material from the first ink used in the formation of a visible image is preferred. In both first inks and second ink, materials used in the preparation of the inks, such as an ultraviolet-curing oligomer and a photopolymerization initiator are preferably high in solubility in water taking into consideration the ejection stability, long-term shelf stability, transparency and the like of the resulting inks.

As the ultraviolet-curing oligomer is preferred an oligomer having an acryloyl group, methacryloyl group or vinyl group in its molecule and at least two polymerizable functional groups in its molecule. Those disclosed in Japanese Patent Application Laid-Open Nos. 2000-186242 and 2000-186243, such as those obtained by polyfunctionalizing a polymerizable functional group such as an epoxyacrylate, urethaneacrylate or acrylate using polyethylene glycol, glycerol, trimethylolpropane, pentaerythritol or the like and adding a necessary amount of ethylene oxide to obtain necessary water-solubility, are preferred. However, the present invention is not limited thereto so far as polymerizable substances are radical-polymerized by ultraviolet light. All the above-mentioned ultraviolet-curing oligomers may be used after a necessary amount of a hydroxyl group, sulfonic group, carboxyl group or ammonium group is added to enhance the water-solubility. As the photopolymerization initiator, is preferred a photo-cleaving α-hydroxyphenyl ketone, Irgacure 2959 (trade name; product of Ciba Specialty Chemicals) or a derivative thereof, a proton-abstracting thioxanthone derivative (used in combination with a proton donor typified by a tertiary alkanolamine, or the like. The photopolymerization initiator may also be used after a necessary amount of ethylene oxide, or a hydroxyl group, sulfonic group, carboxyl group or ammonium group is added to enhance the water-solubility. A reactive diluent may also be used in combination to facilitate a photopolymerization reaction. As the reactive diluent, is preferred morpholine acrylate, vinylpyrrolidone or the like. In order to dissolve the photopolymerization initiator and the ultraviolet-curing oligomer, a small amount of an organic solvent used for the inks described in the first embodiment may be added into the ink. It is also permissible that the above-described surfactants, additives, alcohols having at most three carbon atoms, pH adjusters, bleed preventing agents and/or organic acids are used in order to stably conduct printing or improve the shelf stability of the resulting inks. As the coloring materials of the first inks, the pigments described in the first embodiment may be used as they are. However, preferred dyes are azo metallized dyes which form complexes with an metal ion and are hard to be faded by irradiation of ultraviolet light. As the ultraviolet-curing oligomer, photopolymerization initiator, reactive diluent, organic solvent and additives, may be used the same substances as described above.

In order to cure the transparent ultraviolet-curing ink and the ultraviolet-curing inks, it is necessary that an ultraviolet lamp be built in an ink-jet printer to emit ultraviolet light just after the printing or at the same time as the printing so as to irradiate a printing medium with the ultraviolet light at the same time as the printing to momentarily fix the inks to the printing medium. Even when the printer and the ultraviolet lamp are not integrally formed, the lamp must be arranged about the printer so as to emit ultraviolet light immediately after the printing.

Figure 4:
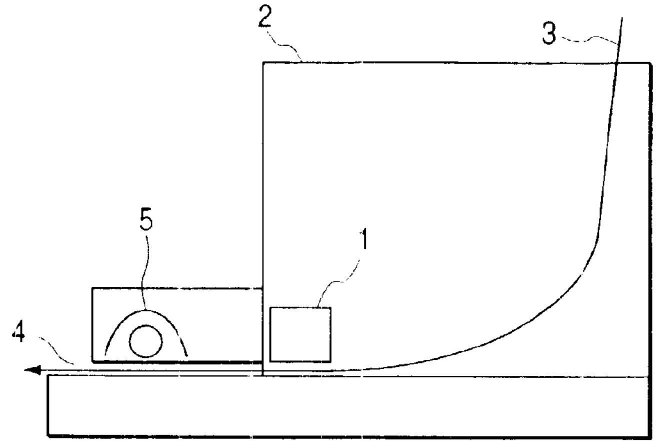
FIG. 4 schematically illustrates an ink-jet printer equipped with an ultraviolet lamp according to an embodiment.

An example where an ultraviolet lamp is arranged in a printer is illustrated in FIG. 4. Reference numeral 1 indicates an ink-jet printing head, 2 an ink-jet printer, 3 a feeding section of a printing medium, 4 a discharging section of the printing medium, and 5 an ultraviolet lamp built in a lamp cover.

The ultraviolet lamp is preferably such a low pressure mercury lamp that the vapor pressure of mercury is 1 to 10 Pa during lighting, a high pressure mercury lamp, or a mercury lamp coated with a fluorescent substance. The emission spectra in an ultraviolet range of these mercury lamps fall within a range of from 184 to 450 nm and are suitable for causing a polymerizable substance in a black or colored ink to efficiently react. Since a small-sized power source may be used, such a mercury lamp is preferred from the viewpoint of mounting the power source in the printer.

As the ultraviolet lamp, may be basically used a metal halide lamp, high pressure mercury lamp, ultrahigh pressure mercury lamp, xenon flash lamp, a lamp using deep UV or microwave to excite a mercury lamp from the outside without using any electrodes, or UV laser because the above range is included as an emission wavelength range so far as the size of the power source, input intensity, lamp form and the like are permissible. A filter may be provided to cut wavelengths of 254 nm or shorter at which ozone is generated, or a lens is installed to focus light. A necessary cumulative dose of ultraviolet light is 500 to 5,000 mJ/cm2. If the cumulative dose is insufficient, the adherence of the ink crusted to the printing medium, and glossiness are not sufficiently exhibited. In the case of a color ink, water fastness may become insufficient in some cases.

EXAMPLES

Ink compositions investigated in the present invention will hereafter be described. In the ink compositions, all designations of "%" mean % by weight unless expressly noted. Water means purified water or ion-exchanged water.

First Ink:

(a) Set of Ultraviolet-Curing Inks:

Inks of the following materials and formulating ratio were used.

| | Formulation | Y ink | M ink | C ink | Bk ink |
|---|---|---|---|---|---|
| Pigment | IJX273B | 24.8 | | | |
| dispersion | IJX266D | | 21.6 | | |
| (*1) | IJX253C | | | 24.7 | |
| | Cab-O-jet 300 | | | | 26.2 |
| Ultraviolet-curing oligomer (*2) | | 10 | 10 | 10 | 10 |
| Photopolymerization initiator (*3) | | 2 | 2 | 2 | 2 |
| Water | | 63.2 | 66.4 | 63.3 | 61.8 |

| Name of pigment dispersion | Name of pigment | Concentration of pigment |
|---|---|---|
| IJX273B | Pigment Yellow 155 | 16.1 |
| IJX266D | Pigment Red 122 | 18.9 |
| IJX253C | Pigment Blue 15:3 | 16.2 |
| Cab-O-jet 300 | Pigment Black 7 | 19.1 |

(*1) As the pigment dispersions, were all used self-dispersing pigment dispersions prepared according to the technique disclosed in U.S. Pat. No. 5,837,045 (Cabot Corporation), in which a sulfonic group was bonded to the surface by a chemical reaction.

(*2) As the ultraviolet-curing oligomer, was used a trifunctional oligomer (trade name: IRR289; product of Daicel UCB Co., Ltd.).

(*3) As the photopolymerization initiator, was used Irgacure 2959 (trade name; product of Ciba Specialty Chemicals) added with 4 moles of ethylene oxide.

(b) Set of Pigment Inks:

| Formulation | Y ink | M ink | C ink | Bk ink |
|---|---|---|---|---|
| PY155 | 24.8 | | | |
| PR122 | | 21.6 | | |
| PB15:3 | | | 24.7 | |
| PBK7 | | | | 26.2 |
| 1,5-Pentanediol | 10 | 10 | 10 | 10 |
| Water | 65.2 | 68.4 | 65.3 | 63.8 |

As the pigment dispersions, were used the following dispersions prepared by using an acrylic alkali-soluble water-soluble polymer as a dispersant and conducting pH adjustment with potassium hydroxide.

| Pigment dispersion | Name of pigment | Concentration of pigment | pH | Average particle diameter |
|---|---|---|---|---|
| Yellow | Pigment Yellow 155 | 16.1 | 9.0 | 189 |
| Magenta | Pigment Red 122 | 18.9 | 9.2 | 164 |
| Cyan | Pigment Blue 15:3 | 16.2 | 9.0 | 106 |
| Black | Pigment Black 7 | 19.1 | 9.6 | 113 |

Second Ink:

| | |
|---|---|
| (A) Ultraviolet-curing clear ink: | |
| IRR289 (product of Daicel UCB Co., Ltd.) | 10% |
| Ethylene oxide adduct of Irgacure 2959 (product of Ciba Specialty Chemicals) | 2% |
| Water | 88%. |
| (B) Clear ink for pigment ink: | |
| Alumina (120 nm) | 3% |
| Styrene-acrylic acid resin (molecular Weight: 7,000) | 1% |
| 2-Pyrrolidone | 5% |
| Triethylene glycol monobutyl ether | 5% |
| Adduct of acetylene glycol with 10 moles of Ethylene oxide | 1% |
| Water | 85% |
| (C) Ultraviolet-curing clear ink: | |
| IRR289 (product of Daicel UCB Co., Ltd.) | 10% |
| Ethylene oxide adduct of Irgacure 2959 (product of Ciba Specialty Chemicals) | 2% |
| Dispersion of titanium oxide (particle Diameter: 180 nm; in terms of pigment solid Concentration) | 3% |
| Water | 85% |

Printing Media:

Evaluation was conducted with the following printing media:

Glossy film (HG201, product of Canon Inc.);

Glossy paper (PR101, product of Canon Inc.); and

Glossy paper (GP301, product of Canon Inc.).

The first inks, second inks and printing media used in Examples and Referential Examples are shown in Table 1.

TABLE 1

| | First ink set | Second ink set | Printing medium |
|---|---|---|---|
| Example 1 | a | C | Glossy film HG201 |
| Example 2 | a | A | Professional |

TABLE 1-continued

| | First ink set | Second ink set | Printing medium |
|---|---|---|---|
| | | | photo-paper PR101 |
| Example 3 | a | A | Glossy paper GP301 |
| Example 4 | b | B | HG201 |
| Example 5 | b | B | PR101 |
| Example 6 | b | B | GP301 |
| Ref. Example 1 | a | Not used | HG201 |
| Ref. Example 2 | a | Not used | PR101 |
| Ref. Example 3 | a | Not used | GP301 |
| Ref. Example 4 | b | Not used | HG201 |
| Ref. Example 5 | b | Not used | PR101 |
| Ref. Example 6 | b | Not used | GP301 |

A printer and a printing method are as follows. The second ink was charged into a container portion for water-proofing and strengthening agents for plain paper in an ink-jet printer (trade name: BJF8500, manufactured by Canon Inc.), and the respective inks making up the first ink set were charged into respective ink container portions of Y, M, C and Bk colors. The application of the second ink to a non-colored portion was performed at a necessary portion (non-colored portion of the printing medium) while a head was reciprocated once on a carriage in the same manner as in the formation of a visible image by the respective inks of Y, M, C and Bk colors. In Examples where a photopolymerizable ink was used for a non-colored printed portion or colored portion, an ultraviolet lamp (bright line spectrum: 365 nm) of the rare gas type was arranged at a portion in which the printing medium was discharged to precure a print, and the print was then completely cured by an ultraviolet irradiation apparatus (F300D, Lamp Type D, manufactured by Fusion System Japan). The complete curing was conducted under conditions that the print was passed through the ultraviolet irradiation apparatus once at a conveyer speed of 3 m/min. As a printing pattern, a gradation pattern having an image density of 0 to 50% was prepared by using the respective inks of Y, M, C and Bk colors.

Ink-jet recorded images were formed as references of the respective Examples in the same manner as in their corresponding Examples except that no second ink was applied to the non-colored portion, and the references were regarded as Referential Examples 1 to 6, respectively.

With respect to the ink-jet recorded articles obtained in the Examples and Referential Examples, each of the images was lifted to the height of the eyes to visually observe it, thereby conducting evaluation as to the uniformity of gloss. As a result, the ink-jet recorded articles according to the Examples had no marked difference in gloss between the visible image portion and the non-recorded portion making up the background of the visible image portion, and uniform gloss was observed in the whole image. On the other hand, in the ink-jet recorded articles according to the Referential Examples as references, a difference in gloss was observed between the visible image portion and the non-recorded portion, and gloss was lost with respect to the whole image. From this fact, it was confirmed that the ink-jet recorded articles according to the present invention are extremely effective for provision of still higher-quality images.

The ink-jet recorded articles obtained in Examples 1 to 6 were subjected to the following gas-proof test. More specifically, the respective recorded articles were left to stand for 36 hours in a chamber in which a mixed gas composed of nitrogen dioxide (1250 ppb), sulfur dioxide (300 ppb) and ozone (1200 ppb), which deeply participate to discoloration of printing media, had been charged. Incidentally, the gas concentrations described above correspond to the condition that the recorded articles was left to stand for 3 months in a room. With respect to the recorded articles before placed in the chamber and after left to stand in the chamber, LE values of non-colored portions at four corners of each printing medium were measured. As a result, the AE values were all smaller than 5, and no discoloration of the printing media was visually observed. It was found from this result that good durability can be imparted to the ink-jet recorded articles according to the present invention because exposed portions of the printing media are eliminated.

According to the present invention, the glossiness of a print can be made uniform by suitably adjusting the composition of a clear ink even when both pigment inks by which the gloss of a printing medium is lost, and ultraviolet-curing inks which exhibit higher glossiness than the printing medium are used. In addition, discoloration or fading of non-printed portions in a print by gases is prevented because the printing medium itself has no exposed portion, and so the long-term shelf stability of the print is improved.

What is claimed is:

1. An ink-jet recording process, comprising the steps of (i) applying a first ink comprising at least one colorant to an opaque printing medium by an ink-jet method to form a visible image; and (ii) applying a second ink, which does not change or substantially not change the hue of the printing medium, to a portion of the printing medium that is complementary to the visible image, thereby alleviating a difference in gloss between the visible image and the portion complementary to the visible image.

2. The ink-jet recording process according to claim 1, wherein a combination of the printing medium and the first ink provides the visible image whose surface shows higher gloss than that of the printing medium, and the second ink increases the surface gloss of the printing medium.

3. The ink-jet recording process according to claim 2, wherein the first ink further comprises a photo-curing oligomer and a photopolymerization initiator, and the second ink comprises a photo-curing oligomer and the photopolymerization initiator.

4. The ink-jet recording process according to claim 1, wherein a combination of the printing medium and the first ink provides the visible image whose surface shows lower gloss than that of the printing medium, and the second ink decreases the surface gloss of the printing medium.

5. The ink-jet recording process according to claim 1, wherein the first ink is a water-based ink containing a water-insoluble coloring material in a dispersed state as the colorant, and the second ink comprises a pigment in a dispersed state.

6. The ink-jet recording process according to claim 5, wherein the pigment in the second ink is a transparent or achromatic pigment.

7. The ink-jet recording process according to claim 6, wherein the transparent or achromatic pigment is at least one selected from the group consisting of silica having an average particle diameter of at most 200 nm, alumina having an average particle diameter of at most 200 nm and titanium oxide having an average particle diameter of at most 200 nm.

8. A method of alleviating a difference in gloss between a visible image formed with at least one ink to an opaque printing medium by an ink-jet method and a portion complementary to the visible image, comprising the step of applying a second ink, which does not color or substantially not color the printing medium, to the portion, thereby alleviating a difference in gloss in the ink-jet recorded image.

* * * * *

UNITED STATES PATENT AND TRADEMARK OFFICE

CERTIFICATE OF CORRECTION

PATENT NO. : 6,863,392 B2
APPLICATION NO. : 10/268961
DATED : March 8, 2005

INVENTOR(S) : Masako Shimomura et al.

It is certified that error appears in the above-identified patent and that said Letters Patent is hereby corrected as shown below:

<u>ON THE COVER PAGE</u>
Item (56), References Cited, Foreign Patent Documents, "200-186243 A" should read --2000-186243 A--.

<u>COLUMN 3</u>
Line 15, "a" should be deleted.

<u>COLUMN 4</u>
Line 2, "that" should be deleted.

<u>COLUMN 5</u>
Line 54, "an" should be deleted.
Line 57, "a" (first occurrence) should be deleted.

<u>COLUMN 7</u>
Line 36, "$No_3^-$," should read --$NO_3^-$,--.

<u>COLUMN 8</u>
Line 44, "an" should read --a-- and "be" should be deleted.
Line 45, "faded" should read --fade--.

<u>COLUMN 12</u>
Line 6, "was" should read --were--.
Line 9, "LE" should read --ΔE--.
Line 11, "AE" should read --ΔE--.

Signed and Sealed this

Twenty-sixth Day of September, 2006

JON W. DUDAS
*Director of the United States Patent and Trademark Office*